United States Patent [19]
Inokuchi

[11] Patent Number: 5,355,676
[45] Date of Patent: Oct. 18, 1994

[54] HYDRAULIC PRESSURE SUPPLY APPARATUS

[75] Inventor: Iwane Inokuchi, Yokohama, Japan

[73] Assignee: Nissan Motor Company, Ltd., Yokohama, Japan

[21] Appl. No.: 773,330

[22] Filed: Oct. 11, 1991

[30] Foreign Application Priority Data

Oct. 11, 1990 [JP] Japan ................. 2-273064

[51] Int. Cl.$^5$ ................. B60K 25/04; F16D 31/02
[52] U.S. Cl. ................. 60/413; 60/450; 60/452
[58] Field of Search ............ 60/404, 413, 417, 418, 60/450, 452, 415, 416, 459, 465

[56] References Cited

U.S. PATENT DOCUMENTS

| | | | |
|---|---|---|---|
| 3,779,017 | 12/1973 | Fujisawa et al. | 60/413 |
| 3,963,039 | 6/1976 | Coeurderoy | 60/413 X |
| 4,085,587 | 4/1978 | Garlinghouse | 60/413 X |
| 4,215,545 | 8/1980 | Morello et al. | 60/413 |
| 4,476,677 | 10/1984 | Hanshaw | 60/413 X |
| 4,523,430 | 6/1985 | Masuda | 60/452 X |
| 4,565,334 | 1/1986 | Ruhl | 242/75.51 X |
| 4,590,763 | 5/1986 | Augoyard et al. | 60/416 X |
| 4,646,518 | 3/1987 | Hochsattel | 60/413 |
| 4,674,280 | 6/1987 | Stuhr | 60/413 |
| 4,712,991 | 12/1987 | Hehl | 425/149 X |
| 4,807,338 | 2/1989 | Myles | 91/35 X |
| 4,891,941 | 1/1989 | Heintz | 60/417 X |
| 4,959,957 | 10/1990 | Schmale et al. | 60/418 X |

FOREIGN PATENT DOCUMENTS 59-151601  8/1984  Japan .
60-176737  9/1985  Japan .

Primary Examiner—Edward K. Look
Assistant Examiner—John Ryznic
Attorney, Agent, or Firm—Lowe, Price, LeBlanc & Becker

[57] ABSTRACT

A hydraulic pressure supply apparatus includes a variable displacement pump which is controlled to change its discharge flow rate and pressure in accordance with a condition of a load side. The pump is communicated with the load side through a conduit to which an accumulator is communicated through a proportional pressure reducing valve controlled so that its regulating pressure is higher than the pressure required in the load side and is lower than a target discharge pressure of the pump. Furthermore, when the pressure in the conduit is lower than the regulating pressure of the valve, the valve is opened and regulates the pressure in the conduit by allowing higher pressure flow from the accumulator.

4 Claims, 15 Drawing Sheets

HYDRAULIC PRESSURE SUPPLY APPARATUS

BACKGROUND OF THE INVENTION

1. Field of the Invention

The present invention relates to improvements in a hydraulic pressure supply apparatus, and more particularly to a hydraulic pressure supply apparatus which includes a variable displacement pump and an accumulator.

2. Description of the Prior Art

JP-A-59-151601 discloses a hydraulic circuit which controls discharge pressure of a pump to a value slightly higher than a load side pressure detected by a pressure sensor. Due to this control, the pump is operated to decrease its power loss while supplying a proper pressure to the load side. Furthermore, in order to improve the pump in size and weight while further improving the power loss of the pump, another hydraulic circuit has been proposed. Such a hydraulic circuit is disclosed in JP-A-60-176737 wherein the hydraulic circuit includes an accumulator to a supply conduit which communicates a pump and a load side such as a hydraulic cylinder. The accumulator is operated to supply working fluid to the load side when the load side requires a flow rate which is greater than a maximum flow rate by the pump. With this conventional circuit, when the load side requires a small flow rate, the pump supplies all fluid required in the load side. When the load side requires a great flow rate, the accumulator supplies fluid to the load side in addition to the supplement by the pump.

However, in the event that the load side requires a large flow rate, the pump is increased in its discharge flow rate and simultaneously supplies fluid to the accumulator for charging since the above-discussed accumulator is always communicated with the pump. This degrades performance of the system in the supplying operation of working fluid to the load side.

SUMMARY OF THE INVENTION

It is an object of the present invention to provide an improved hydraulic pressure supply apparatus which has a superior responsibility in the supplement of proper pressure to a load side while improving the power loss of the pump.

In brief, the above object is achieved by an arrangement wherein a variable displacement pump is controlled to change the discharge flow rate and pressure in accordance with a condition of a load side. The pump is communicated with the load side through a conduit to which an accumulator is communicated through a valve. The valve is controlled so that its set pressure is higher than the pressure required in the load side and is lower than the target discharge pressure of the pump. Furthermore, when the pressure in the conduit is lower than the set pressure of the valve, the valve is opened and regulates the pressure discharged from the accumulator into the set pressure.

More specifically, a first aspect of the present invention is deemed to come in a hydraulic pressure supply apparatus for supplying hydraulic fluid under pressure to a load side, which features: a variable displacement pump which is smoothly changeable of discharge flow rate thereof and operates to approach its real discharge pressure to a target discharge pressure; a conduit communicating the variable displacement pump and the load side; a load pressure control valve disposed between the load side and the conduit, the load pressure control valve controlling a pressure of the hydraulic fluid from the conduit at a regulated pressure; an accumulator communicated with the conduit; a valve disposed between the accumulator and the conduit, the valve starting to reduce pressure of the fluid of the accumulator when the pressure in the conduit is lower than a target reduced pressure; and means for setting the target reduced pressure and the target pump discharge pressure of the pump so that the target pump discharge pressure is greater than the target reduced pressure and the target reduced pressure is greater than a regulated pressure at the load side.

A second aspect of the present invention is deemed to come in a hydraulic pressure supply apparatus for supplying hydraulic fluid under pressure to a load side, which features: a variable displacement pump which is smoothly changeable of discharge flow rate thereof and operates to approach its real discharge pressure to a target discharge pressure; a conduit communicating the variable displacement pump and the load side; a load pressure control valve disposed between the load side and the conduit, the load pressure control valve controlling a pressure of the hydraulic fluid from the conduit at a regulated pressure; an accumulator communicated with the conduit; a valve disposed between the accumulator and the conduit, the valve taking one of an opening state in which the accumulator is communicated with the conduit and a closing state in which the accumulator is not communicated with the conduit; pressure detecting means detecting the real discharge pressure of the pump and outputting a signal indicative of the real discharge pressure of the pump; pressure judging means outputting a first signal when the pump real discharge pressure according to the signal from the pressure detecting means is smaller than the target discharge pressure by at least a predetermined value; discharge commanding means commanding the valve to take the opening state and setting the target discharge pressure of the pump to maximum pump discharge pressure in response to the first signal from the pressure judging means.

A third aspect of the present invention relates to a hydraulic pressure supply apparatus for supplying hydraulic fluid under pressure to a load side, which features: a variable displacement pump which is smoothly changeable of discharge flow rate thereof in accordance with a feed-back signal indicative of a pump discharge pressure; and a target pump discharge pressure a conduit communicating the variable displacement pump and the load side; an accumulator communicated with the conduit; a first valve disposed between the accumulator and the conduit, the first valve taking one of an opening state in which the accumulator is communicated with the conduit and a closing state in which the accumulator is not communicated with the conduit; means for detecting a discharge pressure from the pump; and outputting a first signal indicative of the pump discharge pressure; pressure judging means receiving the first signal from the pump discharge pressure detecting means, said outputting a signal when the pump discharge pressure is smaller than the target discharge pressure by at least a predetermined value; discharge commanding means commanding the first valve to take the opening state and setting the target discharge pressure of the pump to the maximum pressure, in response to the seemed signal from the pressure judging means; a second valve having first, second and third ports, the first and second ports being communicated with a pressure feedback port of the pump, the second port being disposed downstream of the first port relative to the pump, the third port being communicated with a reservoir tank for storing hydraulic fluid therein; and feedback passage switching means taking one of first condition in which the first port to be communicated with the second port and a second condition in which the second port is communicated with the third port, the feedback passage switching means taking the first condition when the first valve takes the closing state and taking the second condition when the first valve takes the opening state.

BRIEF DESCRIPTION OF THE DRAWINGS

In the drawings, like reference numerals designate like parts and elements throughout all figures, in which.

DETAILED DESCRIPTION OF THE INVENTION

Referring now to FIGS. 1 to 6, there is shown a first embodiment of a hydraulic pressure supply apparatus 2 according to the present invention.

Figure 1:
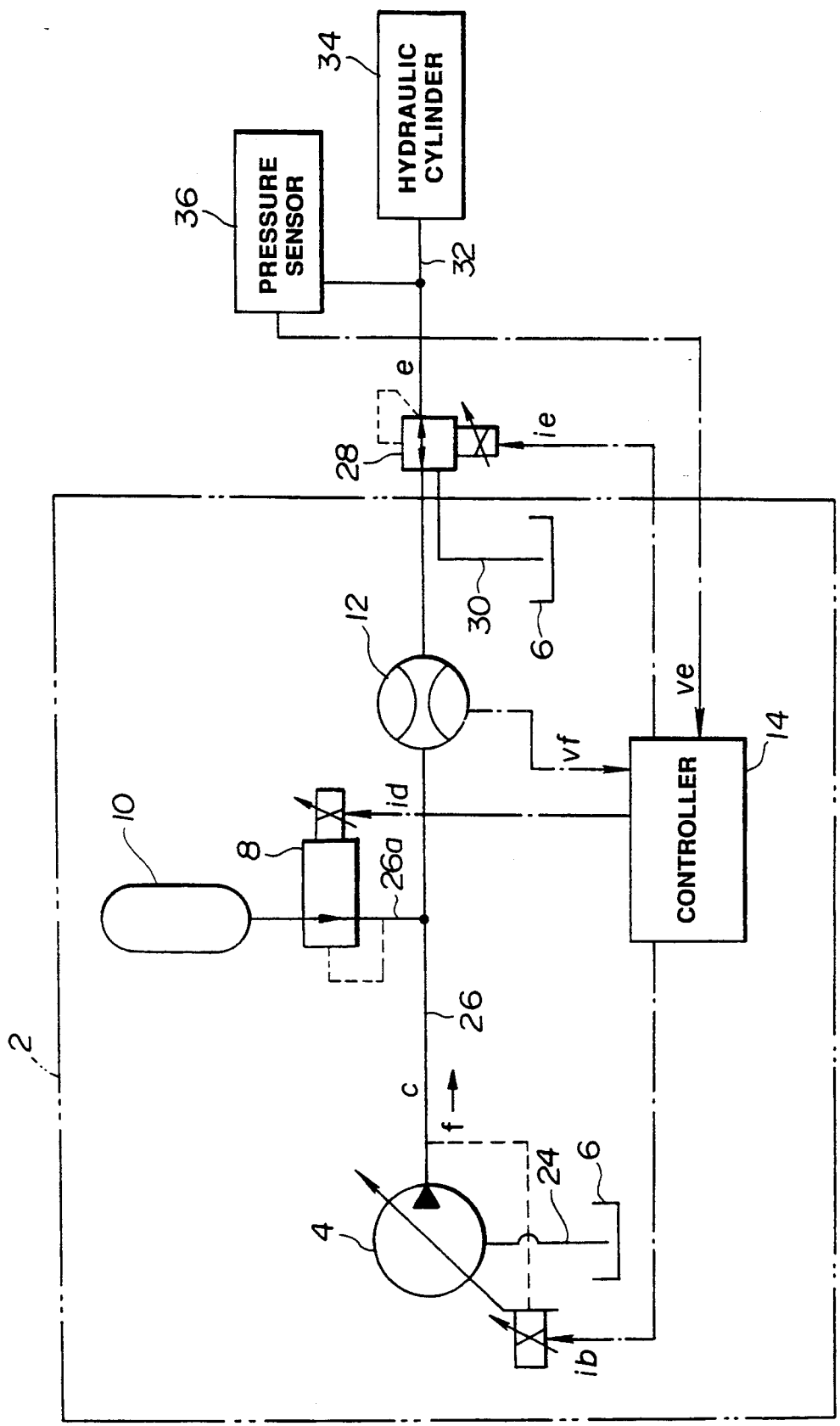
FIG. 1 is a block diagram of a first embodiment according to the present invention.

As shown in FIG. 1, according to a preferred embodiment, the hydraulic pressure supply apparatus 2 is for an internal combustion engine installed in a vehicle, and comprises a variable displacement pump 4 which is powered by the engine. The variable displacement pump 4 is communicated at its intake side with a reservoir tank 6 which stores working fluid returned through a conduit 24. The discharge side of the pump 4 is communicated with a load side through a supply conduit 26. In the way from the pump 4 to the load side, the supply conduit 26 is communicated with a sub-conduit 26a through which a proportional pressure reducing valve 8 of the electromagnetic type and an accumulator 10 of the bladder type are serially communicated. A flow rate sensor 12 for measuring an oil flow rate is connected to the supply conduit 26 downstream of the connecting point of the conduits 26 and 26a. A pressure control valve 28 of the electromagnetic type is communicated at its intake port with the load side of the supply conduit 26. A return port of the pressure control valve 28 is communicated with the reservoir tank 6 through a return conduit 30. The outlet port of the pressure control valve 28 is communicated with a hydraulic cylinder 34 through a conduit 32. The hydraulic cylinder 34 is disposed between a wheel side and a vehicle body, and is arranged to suppress the change of the vehicle statue by means that in the event of the rolling or the like the hydraulic cylinder 34 generates a biasing force against the downward force at the outer wheel side of the vehicle. A pressure sensor 36 is connected to the conduit 32 in order to detect control pressure (load pressure) by the pressure control valve 28. As is clear from the above discussion and FIG. 1, the hydraulic cylinder 34 and the pressure control valve 28 require the hydraulic energy from the hydraulic pressure supply apparatus 2 and act as the load side.

A controller 14 for controlling the pump 4, the pressure reducing valve 8 and the pressure control valve 28, is electrically connected to the flow rate sensor 12 and receives a signal Vf indicative of a flow rate f passing through the supply conduit 26 downstream of the conduit connecting point. The pressure sensor 36 is electrically connected to the controller 14 and outputs a signal Ve indicative of the pressure e upon detecting the control pressure (load pressure) e controlled by the pressure control valve 28.

Figure 2:
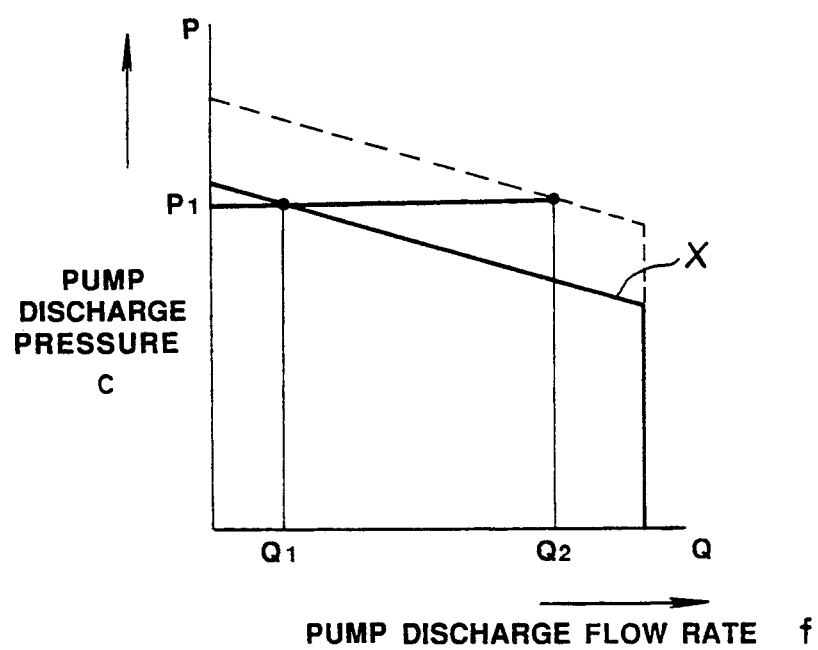
FIG. 2 is a graph showing an output characteristics of a variable displacement pump of FIG. 1.

The variable displacement pump 4 is controlled in its discharge flow rate by the controller 14 so that the discharge flow rate is changed in accordance with a signal $i_b$ outputted from the controller 14. While the variable displacement pump 4 is normally operated so that its discharge flow rate f and real pump discharge pressure c are balanced on a line X shown in FIG. 2, the variable displacement pump 4 changes the balancing point (or line) of the real pump discharge pressure c and flow rate f by the operation of an electromagnetic proportional valve (no numeral) installed to the pump 4. With this changing operation, as shown in FIG. 2, the pump 4 changes its flow rate from $Q_1$ to $Q_2$ while keeping the discharge pressure P1.

The proportional pressure reducing valve 8 includes a proportional displacement solenoid (no numeral) to which a control signal $i_d$ is fed from the controller 14 in order to change a communication state between the accumulator 10 and the pump 4. That is to say, when the thrust force of the solenoid is greater than the biasing force due to the pump discharge pressure, the proportional pressure reducing valve 8 is opened and the fluid in the accumulator 10 is discharged at a set pressure (set value) in accordance with the command from the controller 14 to the proportional pressure reducing valve 8.

The pressure control valve 28 is of a proportional pressure reducing valve of the three port type. The pressure control valve 28 proportionally changes pressure and output the control pressure e to an outlet port of the pressure control valve 28, in accordance with a control signal $i_e$ from the controller 14.

The controller 14 includes a A/D converter, a microcomputer, a D/A converter, and a solenoid drive circuit. The controller 14 controls the pump 4 and the proportional pressure reducing valve 8 upon receiving the signals Vf and Ve from the flow rate sensor 12 and the pressure sensor 36.

The manner of operation of the first embodiment of the hydraulic pressure supply apparatus 2 will be discussed hereinafter with reference to FIGS. 3 to 5.

Figure 3:
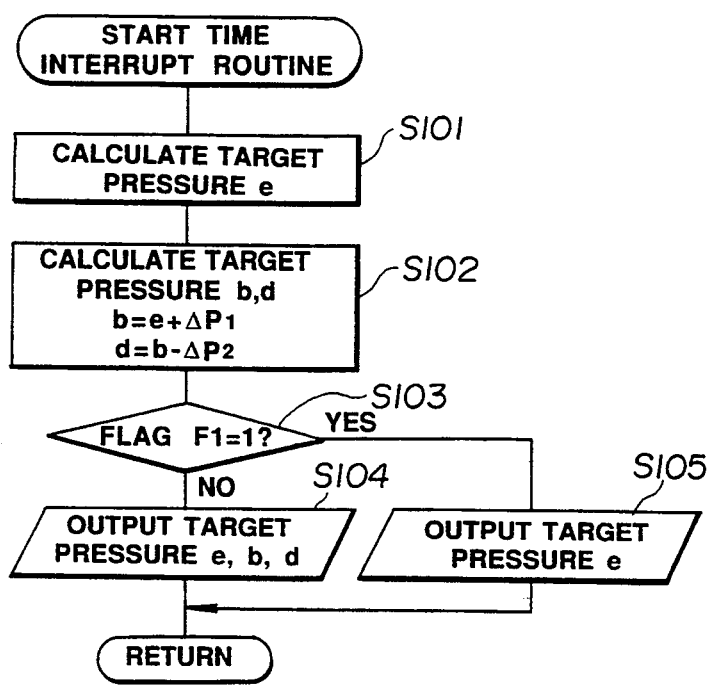
FIGS. 3 to 5 are flow charts which show routines carried out by a controller of FIG. 1.

The micro-computer of the controller 14 processes a subroutine shown by a flow chart in FIG. 3 at predetermined intervals, such as at 20 msec. intervals.

In a step S101, in order to control the hydraulic cylinder 34 so as to carry out a predetermined operation such as an operation which suppresses the rolling of the vehicle, the micro-computer calculates a target control pressure (load pressure) e in accordance with signals indicative of a vehicle travelling condition.

In a step S102, in accordance with the target control pressure e calculated in the step S101 and predetermined pressure differences $\Delta P1$ and $\Delta P2$, a target pressure value b of a pump discharge pressure (target pump discharge pressure b) and a target pressure value d of a reduced pressure (target reduced pressure d) are calculated as follows:

$b = e + \Delta P1$, $d = b - \Delta P2$, where the target values e, b, and d have a relationship that $b > d > e$.

In a step S103, it is judged whether a flag F1 is "1" or "0", in which the content of the flag F1 indicates whether the accumulator 10 is in a charging operation or not. When the flag F1 is "0" (F1=0), it is judged that the accumulator 10 is not in the charging operation, and the program proceeds to a step S104.

In the step S104, the target values e, b and d are outputted to the drive circuit through the D/A convertor. That is to say, the controller 14 outputs the control signal $i_e$ corresponding to the target load pressure e to the pressure control valve 28, the control signal $i_b$ corresponding to the target pump discharge pressure b to the variable displacement pump 4, and the control signal $i_d$ corresponding to the target reduced pressure d to the proportional pressure reducing valve 8. Therefore, the target control pressure e is set at a desired value, and the proportional pressure reducing valve of the pump 4 is set in a driving condition corresponding to the target pump discharge pressure b. Further, the proportional solenoid of the pressure reducing valve 8 outputs thrust force corresponding to the proportional target reduced pressure d.

When in the step S103 the flag F1 is "1" (F1=1), the program proceeds to a step S105 wherein only the target value e is outputted. Following this, the program returns to the routine from which the program has jumped.

While the target pump discharge pressure b and the target reduced pressure d are calculated in accordance with the target control pressure e calculated in accordance with the signal indicative of the vehicle travelling condition, the target pump discharge pressure b and the target reduced pressure d may be calculated in accordance with the signal Ve from the pressure sensor 36.

The precessing of the flow chart shown in FIG. 4 will be discussed hereinafter.

In a step S201, the controller 14 reads in a signal Vf outputted from the flow rate sensor 12 and decides a supply flow flow rate f to the load side by looking up a data map preset in the controller 14.

In a step S202, it is judged whether the flow rate f is smaller than a reference value h or not, in which the reference value h is of a value to judge whether the pump 4 has a margin in discharge flow rate. When the judgment in the step S202 is "YES" (f<h), the program proceeds to a step S203 wherein a timer T1 is incremented (T1=T1+1). Following this, the program proceeds to S204.

In the step S204, it is judged whether the timer T1 is equal to "j" or not. When the judgment in the step S203 is "NO" (T1≠j), the program returns to the step S202. When the judgment in the step S203 is "YES" (T1=j), the program proceeds to a step S205 wherein the timer T1 is cleared (T1=0).

In a step S206, the supply flow rate f is again inputted in the controller 14 in accordance with the detected signal Vf from the flow rate sensor 12. In a step S207, it is judged whether the flow rate f is smaller than a reference value h or not, as being similar to the operation in the step S202. That is, it is judged whether the flow rate f is maintained in a condition that f<h after j seconds. When the judgment in the step S207 is "YES" (f<h), the program proceeds to a step S208 wherein it is judged whether the flag F2 is "1" or not. When the judgment in the step S207 is "NO" (F2=0), that is, the accumulator 10 does not finish the charging operation, the program proceeds to a step S209 wherein the program jumps to a start step of a charging sub-routine shown in FIG. 5. After the processing of the charging sub-routine, the program returns to the routine of FIG. 5 and proceeds to a step S210.

In the step S210, the flag F2 is set in "1" (F2=1) and the program returns to the step S201.

On the other hand, when the judgment in the step S202 is "NO" (f≧h), the program proceeds to a step S211 wherein the flag F2 is set to be "0" (F2=0) and returns to the step S201. When the judgment in the step S207 is "NO" (f≧h), the program proceeds to a step S211 wherein the flag F2 is set to be "0" (F2=0) and returns to the step S201. When the judgment in the step S208 is "YES" (F2=1), the program proceeds to the step S201.

Next, the operation of the sub-routine for charging to the accumulator 10 will be discussed hereinafter with reference to a flow chart shown in FIG. 5.

In a step S301, the flag F1 is set to be "1" (F1=1), and the program proceeds to a step S302.

In the step S302, the target discharge pressure b of the pump 4 is set at the maximum discharge pressure Pmax (b=Pmax), and the program proceeds to a step S303.

In the step S303, the target reduced pressure d of the proportional pressure reducing valve 8 is set at $P_{max} + \alpha$ ($d = P_{max} + \alpha$), and the program proceeds to a step S304.

In the step S304, the target pump discharge pressure b and the target reduced pressure d are outputted, so that the controller 14 outputs the control signals ib indicative of the target pump discharge pressure b, and outputs the control signal $i_d$ indicative of the target reduced pressure d. Thus, the pump 4 outputs target pump discharge pressure b, and the reducing valve 8 regulates pressure at the target reduced pressure d.

In a step S305, a timer T2 is incremented (T2=T2+1) and the program proceeds to a step S306 wherein it is judged whether the timer T2 is "k" or not. When the timer T2 is not "K", the program returns to the step S305, that is, the steps S305 and S305 are a waiting routine in which a time period is counted until the timer T2 becomes "k". When the timer T2 is "k", that is, when k seconds have been passed, the program proceeds to a step S307.

In the step S307, the timer T2 is cleared (T2=0) and the program proceeds to a step S308 wherein the flag F1 is set to be "0" (F1=0). Then, the sub-routine returns to the routine shown in FIG. 4.

The manner of total operation of the thus arranged hydraulic pressure supply apparatus 2 in accordance with the present invention will be discussed hereinafter with reference to a graph shown in FIG. 6.

The graph starts from a condition in that the required flow rate in the load side is small, the supply flow rate f is smaller than the reference value h, and the accumulator 10 has already finished a charging. When the load side is operated in small load, the controller 14 controls the pressure control valve 28 to output a desired load pressure e to the hydraulic cylinder 34 by processing the routine shown in FIG. 4. With this operation, the hydraulic cylinder 34 proceeds a predetermined operation. Simultaneously, the controller 14 decides a target pump discharge pressure b of the pump 4 and the target reduced pressure d of the proportional pressure reducing valve 8 by adding predetermined value $\Delta P1$ to the load pressure e and adding a predetermined value $\Delta P1 - \Delta P2$ to the load pressure e, wherein the load pressure e, the target pump discharge pressure b and the target reduced pressure d have a relationship that $b > d > e$, as shown in a time period from a time point t0 to time point t1 in FIG. 6. In this condition, although the controller 14 processes the routine of FIG. 4, the accumulator charging operation corresponding to the step S209 in FIG. 4 is not carried out since the flag F2 is "1", that is, the accumulator has finished the charging.

Figure 6:
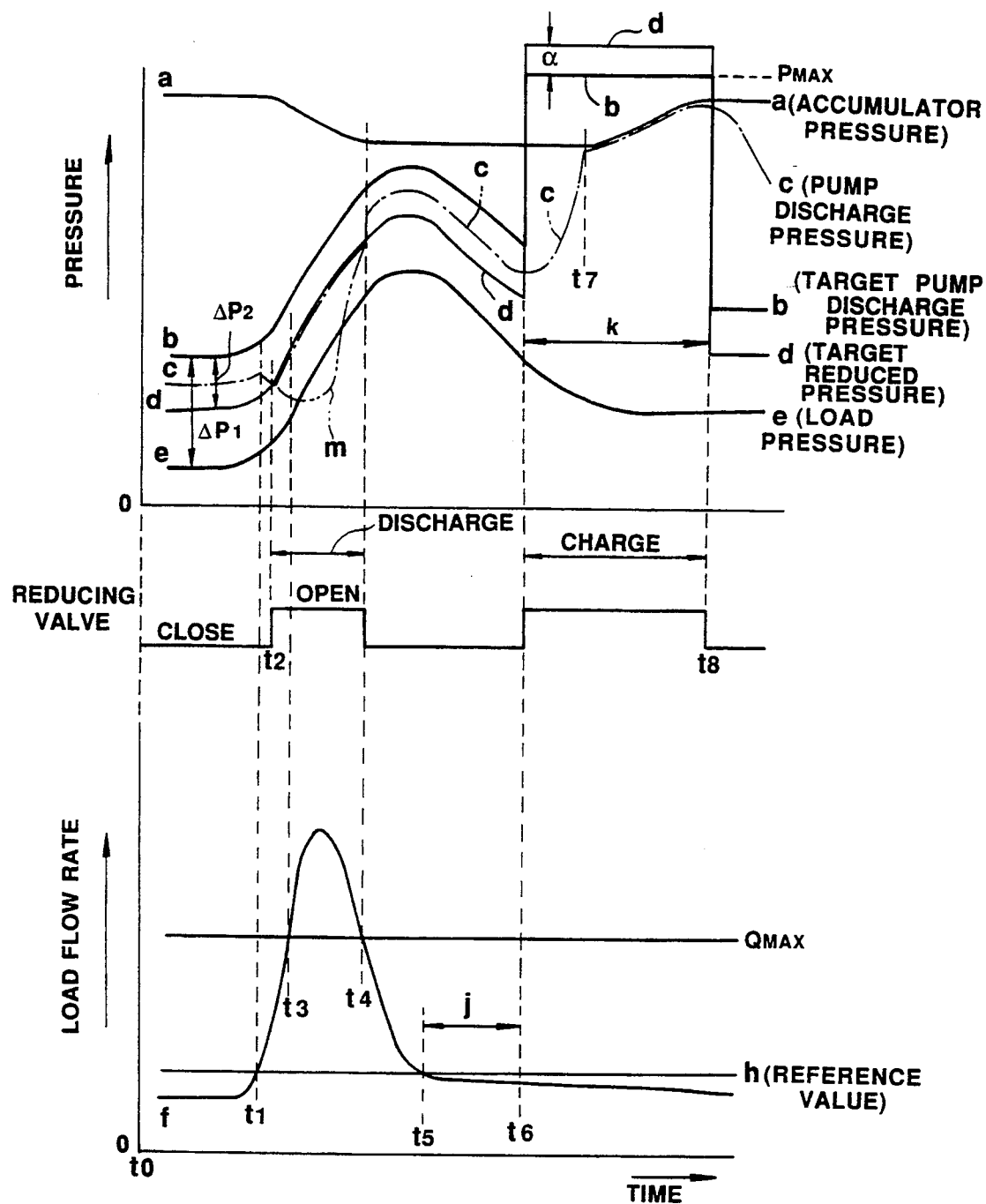
FIG. 6 is a timing chart showing a typical example of operation by the first embodiment.

Although the real discharge pressure c of the pump 4 is smaller than the target pump discharge pressure b in the time period from the time point $t_0$ to the time point $t_1$ in FIG. 6, the real discharge pressure c is slightly lower than the target pump reduced discharge pressure d and slightly higher than the controlled pressure e ($b > c > e$). Accordingly, the real discharge pressure c is sufficient for the pressure control valve 28 to supply the load pressure to the hydraulic cylinder 34 without occurring a lack of pressure. Although the real discharge pressure c is supplied to the proportional pressure reducing valve 8, the proportional pressure reducing valve 8 operates 20 that the accumulator 10 is not communicated with the supply conduit 26 since the target reduced pressure d is lower than the real discharge pressure c ($c > d$).

Furthermore, since the discharge flow rate from the pump 4 is controlled so that the thrust force of the proportional valve of the pump 4 is balanced with the force by the discharge pressure c, the pump 4 has a sufficient capacity to supply a needed flow rate to the load side. Thus, since the pump 4 is efficiently operated, the energy efficiency in this apparatus 2 is kept high without wasting the power applied to the pump 4. Additionally, since the accumulator 10 is fluidly separated from the pressure supply conduit 26, the change of the discharge flow rate from the pump 4 is directly transmitted with no relation to the condition of the accumulator 10. This improves a responsibility of the real discharge pressure c in response to the change of load. In addition, since the real discharge pressure c is set to be slightly higher than the load pressure e and is supplied to the hydraulic cylinder 34 upon being reduced by the pressure control valve 28, the apparatus 2 achieves a high responsibility in the fluid supplement to the load side in response to the change of the load.

Figure 4:
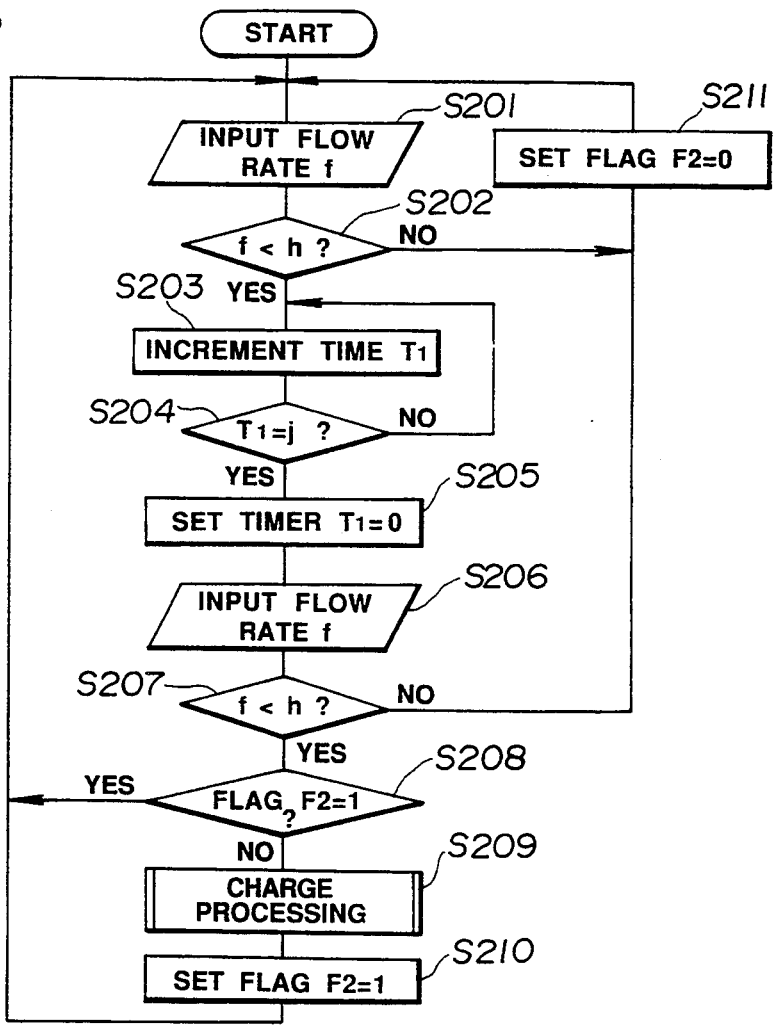

In a condition that the working fluid starts to be flowed to the load side in response to the command for raising the load pressure e, that is, the operating condition is generally at a time point $t_1$ in FIG. 6, the controller 14 judges in the processing of FIG. 4 that the load flow rate f is greater than or equal to the reference value h at the time point $t_1$. Accordingly, the charging operation to the accumulator 10 is not carried out. In this increasing condition of the required flow rate f, although the discharge flow rate is increased by the feedback operation of the pressure of the pump 4, the increasing flow rate is not sufficient for the load side since the responsibility of the pump 4 is lower than that of the pressure control valve 28. As a result of the lack of the discharge flow rate, the discharge pressure c starts to be lowered after the time point $t_1$. By processing the routine shown in FIG. 3, when the discharge pressure c of the pump 4 is lowered and becomes smaller than or equal to the target reduced pressure d of the proportional pressure reducing valve 8, the proportional pressure reducing valve 8 operated so as to communicate the accumulator 10 and the supply conduit 26. Furthermore, the proportional pressure reducing valve 8 operates to regulate a pressure from the accumulator 10 to a target reduced pressure d.

The pressurized fluid from the accumulator 10 is supplied through the supply conduit 26 to the load side upon being regulated into the target reduced pressure d on and after the time point t2. Accordingly, the real discharge pressure c of the pump 4 is adjusted with the target pump discharge pressure d as shown in FIG. 6 (at the time point t4). Although the target regulated pressure d is set to be lower than the target pump discharge pressure b of the pump 4, the target regulated pressure c is set to be higher than the load pressure e. Accordingly, the pressure control valve 28 smoothly supplies a proper pressure to the load side.

In a time period from the time point t2 to the time point t4, since the load pressure e is increasing, the target pump discharge pressures b and the target reduce pressure d are increased while keeping a constant pressure difference relative to the load pressure e. Although the load flow rate f is over the maximum discharge flow rate Qmax at a time point t3, the real discharge pressure c is raised while corresponding to the raising of the target reduced pressure d.

When the load flow rate f again decreases until becomes equal to the maximum discharge flow rate Qmax (corresponding to the time point t4), the pump 4 can supply a sufficient flow rate to the load side and raises its real discharge pressure c. Accordingly, at the time point t4, the proportional pressure reducing valve 8 is closed since the pump discharge pressure c is over the target reduced pressure d. Therefore, the accumulator 10 is stopped supplying the pressurized working fluid to the load side.

With the thus arranged hydraulic pressure supply apparatus 2, the drop of the supply pressure as indicated by an imaginary line m in FIG. 6, which will occur in a conventional apparatus without accumulator, is prevented from occurring. Also, an unstable load control, such as an incomplete cylinder control caused by the lack of the supply pressure ($c < e$), is prevented from occurring. Furthermore, even if the load flow rate f is over the maximum discharge flow rate Qmax, the lacking flow rate (f-Qmax) is supplied from the accumulator 10. Therefore, it is not necessary that the pump 4 is designed to have a capacity applicable to the maximum discharge flow mount. This realizes a t5 pump to make small in size.

After the time point t4, the load flow rate f is gradually lowered while being kept smaller that the maximum discharge flow rate Qmax. In this condition, the target pressures b and d, and the real pump discharge pressure c are changed along the curve of the regulated load pressure e derived from the precessing of FIG. 4 while keeping a relationship that b>c>d>e. When the load flow rate f becomes lower than the reference value h at the time point t5, the controller 14 judges in the step S202 that the reference value h is higher than the load flow rate f and processes the steps 203 and 204 which is a timer precessing while continuing the precessing of FIG. 3. After j seconds are counted in the steps 203 and 204, again the controller 14 receives the signal indicative of the load flow rate f and judges in the step S207 whether the load flow rate f is smaller than the reference value h. When the judgment in the step S207 is "YES", the controller 14 judges that the discharge flow rate of the pump 4 is now sufficient due to the decreasing of the load flow rate f, and the program proceeds to the step 209 (the charge sub-routine shown in FIG. 5) wherein the accumulator 10 start the charging.

In the charging operation, the controller 14 commands only the control pressure e though calculating the target pump discharge pressure b and the target reduced pressure d. In the precessing of the charge sub-routine, the target pump discharge pressure b is set maximum, and the target reduced pressure d of the proportional pressure reducing valve 8 is set to be (b+α). Accordingly, the pump discharge pressure c becomes smaller than the target reduced pressure d, and the proportional pressure reducing valve 8 is opened to communicate the accumulator 10 and the supply conduit 26. Then, since the target pump discharge pressure b is set maximum and the target reduced pressure d is set to be higher than the target pump discharge pressure b, the real pump discharge pressure c is radically raised to the maximum pressure just after the time point t6. The accumulator 10 starts the charging of the hydraulic energy from the time point t7 that the real pump discharge pressure c corresponds to the pressure a of the accumulator 10. The accumulator 10 stores the hydraulic pressure energy nearly equal to the maximum pressure Pmax of the pump 4 by a time point t8 that k seconds past the time point t6.

Figure 5:
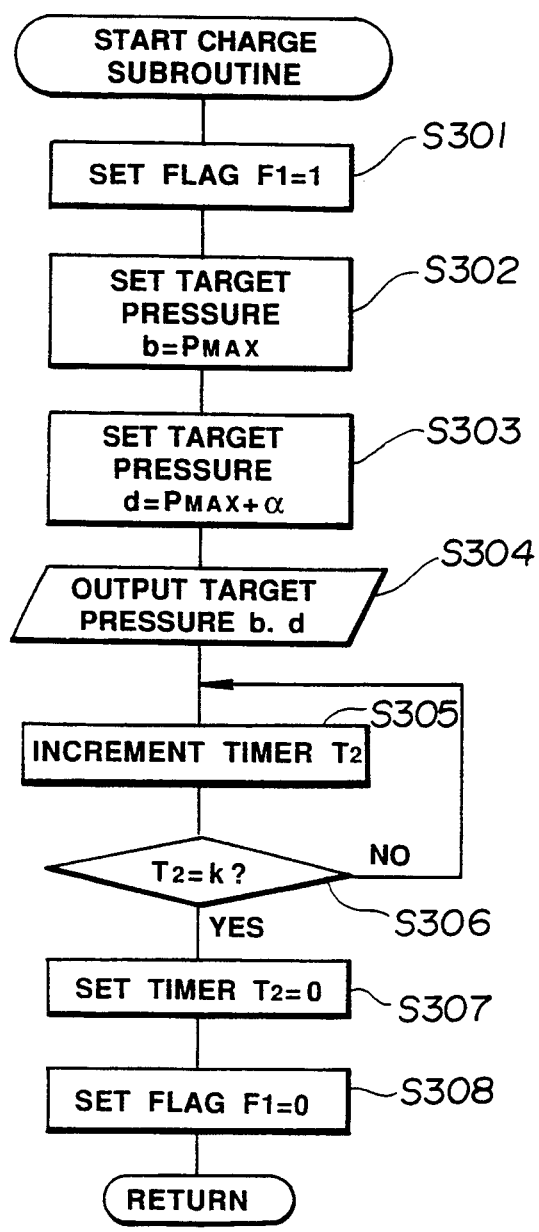

The controller 14 finishes the charge sub-routine shown in FIG. 5 at the time point t8. The steps S103 and S104 are again carried out, and the target pump discharge pressure b and the target reduced pressure d take normal values so that the real pump discharge pressure c is higher than the target reduced pressure d. Accordingly, the proportional reducing valve 8 is closed to cut the communication between the accumulator 10 and the supply conduit 26. Therefore, the accumulator 10 stores a pressurized hydraulic pressure energy therein.

After the charging operation, since the flag F2 is "1" although the controller 14 carries out the above-discussed normal operation, the charging operation to the accumulator 10 is not carried out as far as the flag F2 is "1", that is, until the load flow rate f again becomes greater than or equal to the reference value and the accumulator 10 discharges the stored hydraulic pressure. This largely improves the operation of the pump 4 in a case that low load condition is maintained for a long time.

Figure 7:
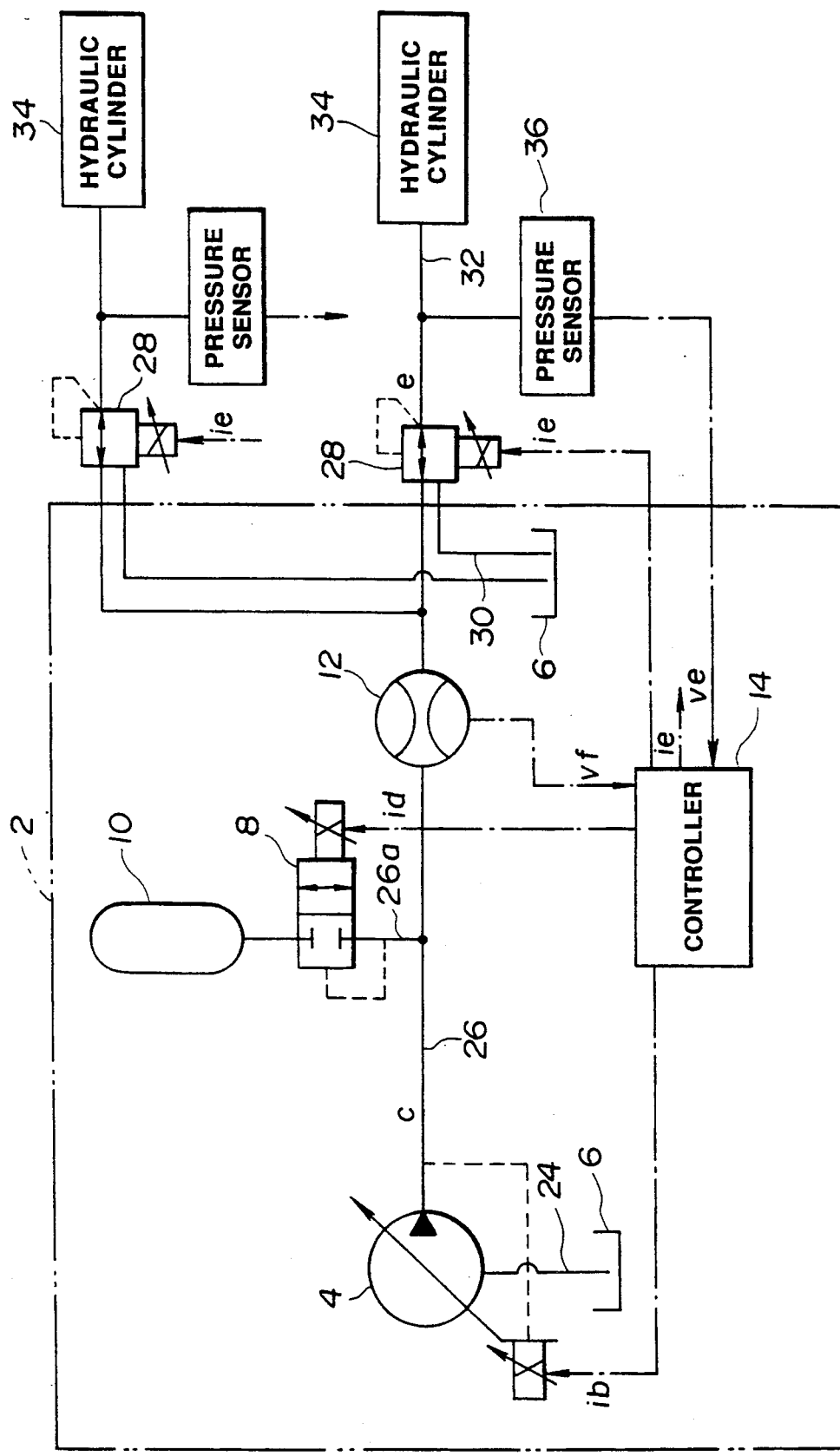
FIG. 7 is a block diagram of a second embodiment according to the present invention.

A second embodiment of the hydraulic pressure supply apparatus 2 will be discussed hereinafter with reference to a block diagram shown in FIG. 7.

The structure of the second embodiment is similar to that of the first embodiment except that two pressure control valves 28 and two hydraulic cylinders 34 are installed to the apparatus 2. The supply conduit 26 is branched into two conduits and is communicated through each pressure control valves 28 with each hydraulic cylinders 34. Each pressure control valve 38 has a return port which is communicated through a return conduit 30 to the reservoir tank 6.

The operation of the controller 14 of the second embodiment is similar to that of the first embodiment except that the controller 14 of the second embodiment sends each control signal $i_e$ in accordance with each target load pressure e to each pressure control valve 28. With this arrangement, the hydraulic pressure supply apparatus 2 of the second embodiment performs as that of the first embodiment does, ever if the hydraulic pressure supply apparatus 2 is communicated with a plurality of load sides.

A third embodiment of the hydraulic pressure supply apparatus 2 will be discussed hereinafter with reference to FIGS. 4, and 8 to 11.

Figure 8:
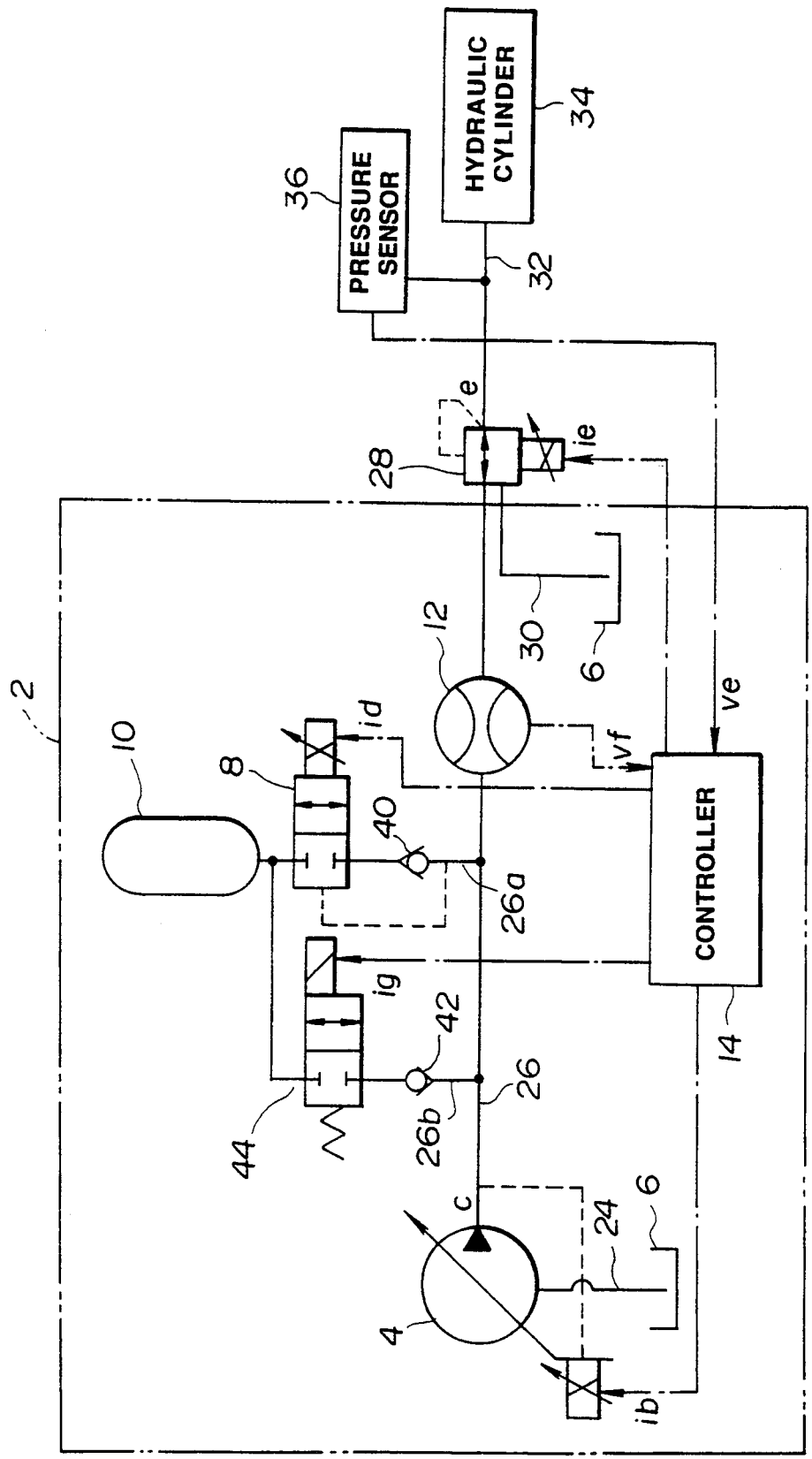
FIG. 8 is a block diagram of a third embodiment according to the present invention.

The third embodiment of the hydraulic pressure supply apparatus 2 is generally similar to the first embodiment except for a mechanism for controlling the charge-discharge operation of the accumulator 10. As shown in FIG. 8, a check valve 40 is installed to the sub-conduit 26a upstream of the pressure reducing valve 8 in order to prevent working fluid from flowing from the supply conduit 26 to the accumulator 10. A second subconduit 26b is arranged to be parallel with the sub-conduit 26a. An electromagnetic switching valve 44, which is of the two position and two port type and has a return spring, is installed to the second sub-conduit 26b. A second check valve 42 is installed to the second sub-conduit 26b upstream of the electromagnetic switching valve 44 in order to prevent working fluid from flowing from the accumulator 10 to the supply conduit 26. A solenoid of the electromagnetic switching valve 44 receives a switching signal $i_g$ from the controller 14. When the switching signal ig is "ON", the switching valve 44 is set at an opening position. When the switching signal ig is "OFF", the switching valve 44 is set at an closing position.

Figure 9:
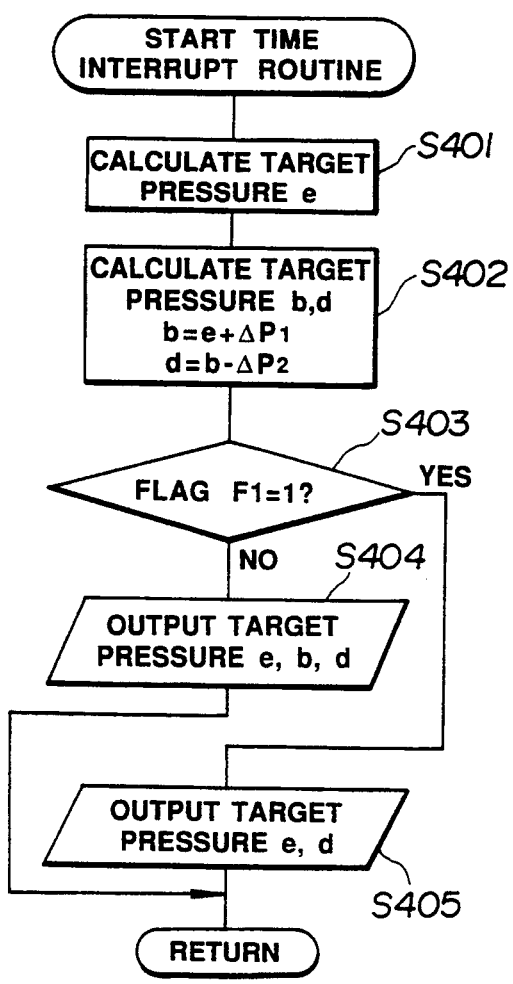
FIGS. 9 and 10 are flow charts which show routines carried out by a controller of the third embodiment.
Figure 10:
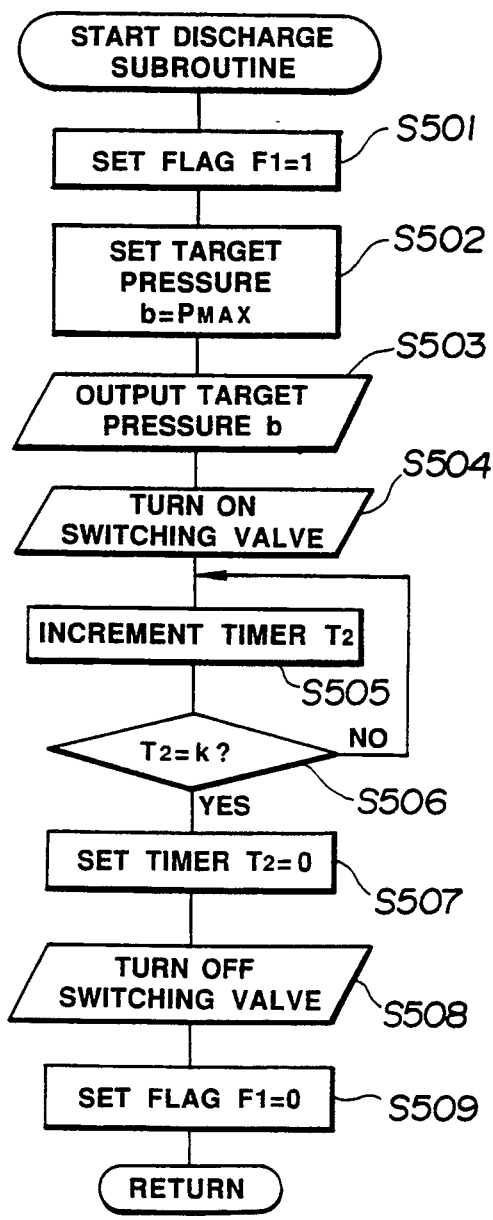

The controller 14 carries out the processing shown in FIGS. 4, 9 and 10. The routine shown in FIG. 9 is carried out as a time interrupt routine at predetermined intervals Δt such as 20 msec.

The operation in steps S401 to S404 in FIG. 10 are similar to that in the steps S101 to S104. However, when the judgment in the step S403 is "YES" (F1=1), the program proceeds to a step S405 wherein the target load pressure e and the target reduced pressure d are outputted. That is, the target pump discharge pressure b is not outputted.

A discharge sub-routine processing shown in FIG. 10 is carried out when the program proceeds to the step S209 in FIG. 4.

In a step S501, the controller 14 outputs a signal that the flag F1 is "1" (F1=1). In a step S502, the controller 14 decides the target pump discharge pressure b to be maximum (b=Qmax).

In a step S503, the controller 14 outputs the target pump discharge pressure b decided in the step S502 so as to operate the proportional valve of the pump 4 in response to the target pump discharge pressure b.

In a step S504, the controller 14 outputs a switching signal $i_g$ set at an ON state to the switching valve 44 to open itself.

In steps S505 to S507, the timer T2 is incremented (T2=T2+1) and the program waits therein until the timer T2 becomes k seconds (T2=k). After k seconds, the program proceeds to the step S507 wherein n the timer T2 is cleared. Following this, the program proceeds to a step S508 wherein the controller 14 outputs a switching signal ig set at an OFF state to the switching valve 44 to close itself. In a step S509, the flag F1 is set to be "1" (F1=1), and the program returns to the routine in FIG. 4.

Figure 12:
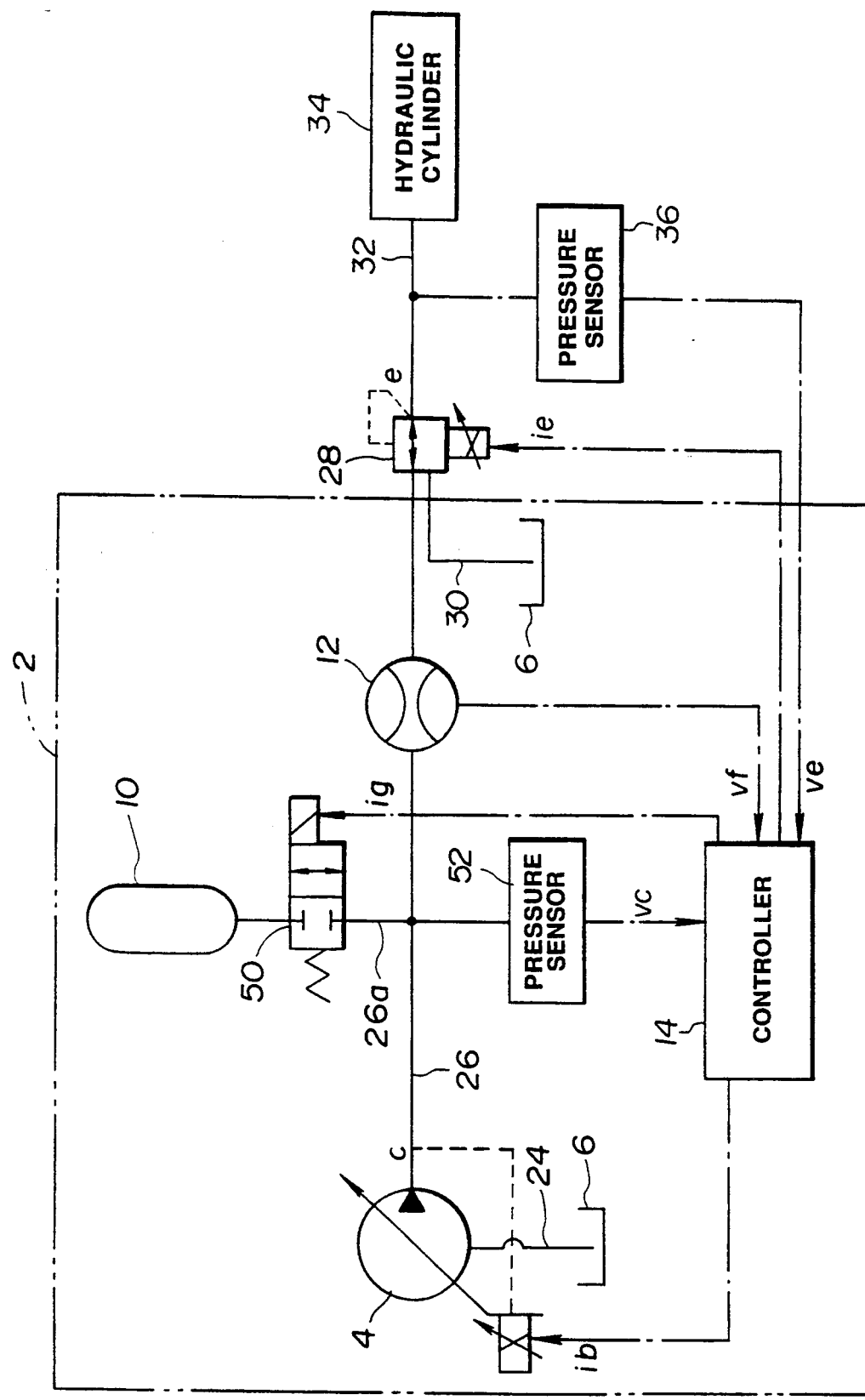
FIG. 12 is a block diagram of a fourth embodiment according to the present invention.

With this arrangement, the various pressures is controlled along the time as shown in FIG. 12. The controlling of the various pressures from the time point t0 to the time point 16 of the third embodiment is similar to that of the first embodiment. That is, for a time period from the time point t2 that the discharge pressure c becomes smaller than the target reducing pressure d to the time point t4 that the load flow rate f becomes smaller than the maximum discharge flow rate Qmax., the pressure proportional reducing valve 8 is opened and the switching valve 44 is closed. Accordingly, in this time period, the working fluid is supplied through the pressure reducing valve 8 and the check valve 40 to the load side upon being reduced to a target reduced pressure d.

Figure 11:
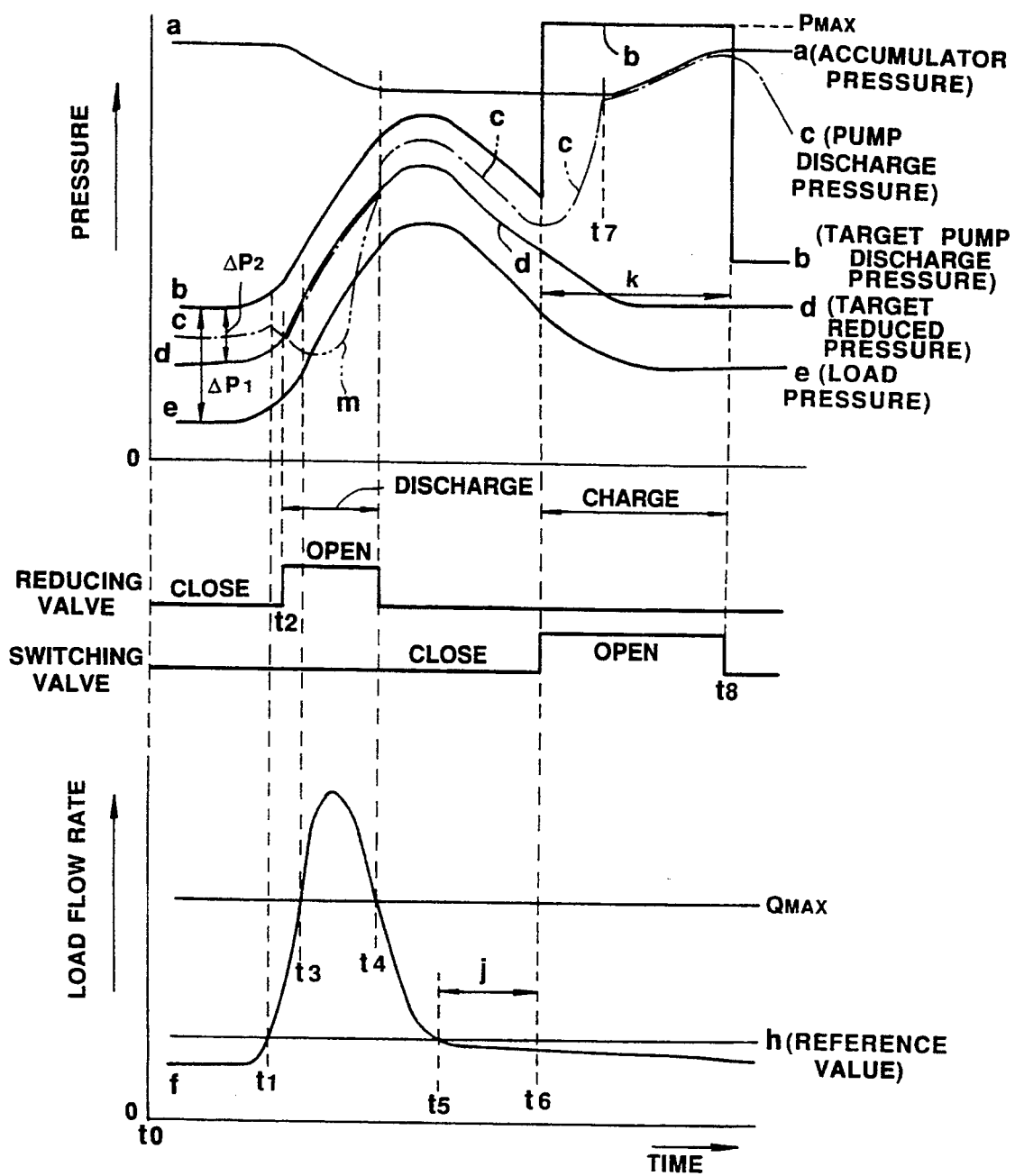
FIG. 11 is a timing chart showing a typical example of operation by the third embodiment.

When it is judged that the pump 4 has a sufficient capacity to store the pressurized fluid to the accumulator 10 at the time point t6, the target pump discharge pressure b is set to be equal to the maximum pressure Pmax (b=Pmax), and the target reduced pressure d is set to be equal to $e+(\Delta P1-\Delta P2)$, that is, $d=e+(\Delta P1 \Delta P2)$. Accordingly, the pump discharge pressure c is maintained to be greater than the target reducing pressure d. This keeps the reducing proportional pressure valve 8 in a closing state. The switching valve 44 is opened in accordance with the command of the step S504 in FIG. 10. Therefore, after the time point t6, the working fluid is fed through the check valve 42 and the switching valve 44 to the accumulator 10 due to the discharge pressure c which is radically raised. Accordingly, the accumulator 10 is charged to the value generally similar to the maximum discharge pressure Pmax. as shown in FIG. 11.

At the time point t8, that is, k seconds past the time point t6, the switching valve 44 is closed due to the processing of the step S508, and the target pump discharge pressure b is set to take a normal value due to the processing of the step S404.

With this arrangement, the third embodiment of the hydraulic pressure supply apparatus 2 performs good functions generally similar to that of the first embodiment.

A fourth embodiment of the hydraulic pressure supply apparatus 2 will be discussed hereinafter with reference to FIGS. 12 to 17.

The hydraulic pressure supply apparatus 2 comprises a electromagnetic type switching valve 50 which is disposed between the supply conduit 26 and the accumulator 10 through a sub conduit 26a. The switching valve 50 is electrically connected to the controller 14 so as to be receivable of a switching signal ig. When the switching signal ig takes an on state, the switching valve 50 is opened. When the switching signal $i_g$ takes an OFF state, the switching valve 50 is closed. A pressure sensor 26 is connected to the supply conduit 26 and supplies a signal Vc indicative of the pump discharge pressure c to the controller 14.

Figure 13:
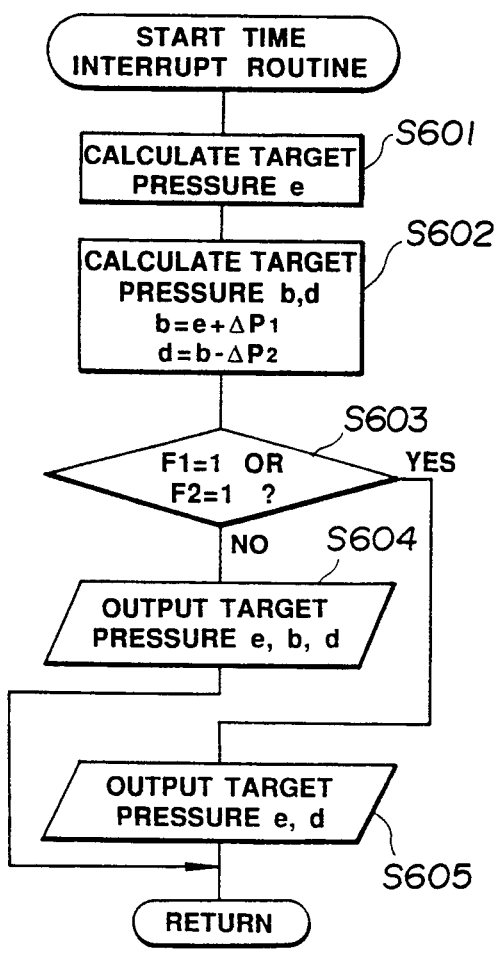
FIGS. 13 to 16 are flow charts which show routines carried out by a controller of the fourth embodiment.

The controller 14 carries out the flow chart shown in FIGS. 13 to 16. The processing in FIG. 13 is similar to that in FIG. 9 except for a step S603 in FIG. 14. In the step S603, it is judged whether at least one of the flag F1 and F2 is "1" or not, that is, whether the accumulator 10 is in a charging or discharge operation or not. When the judgment in the step S603 is "YES", the program proceeds to a step S605 wherein the controller 14 outputs the target load pressure e and the reference pressure (value) d. When the judgment in the step S603 is "NO", the program proceeds to a step S604 wherein the controller 14 outputs the load pressure e, the target pump discharge pressures b and the reference pressure d. In the processing of the flow chart in FIG. 13, character d indicates a reference value relative to the lowering of the pump discharge pressure.

The operation of the flow chart shown in FIG. 14 will be discussed hereinafter.

Figure 15:
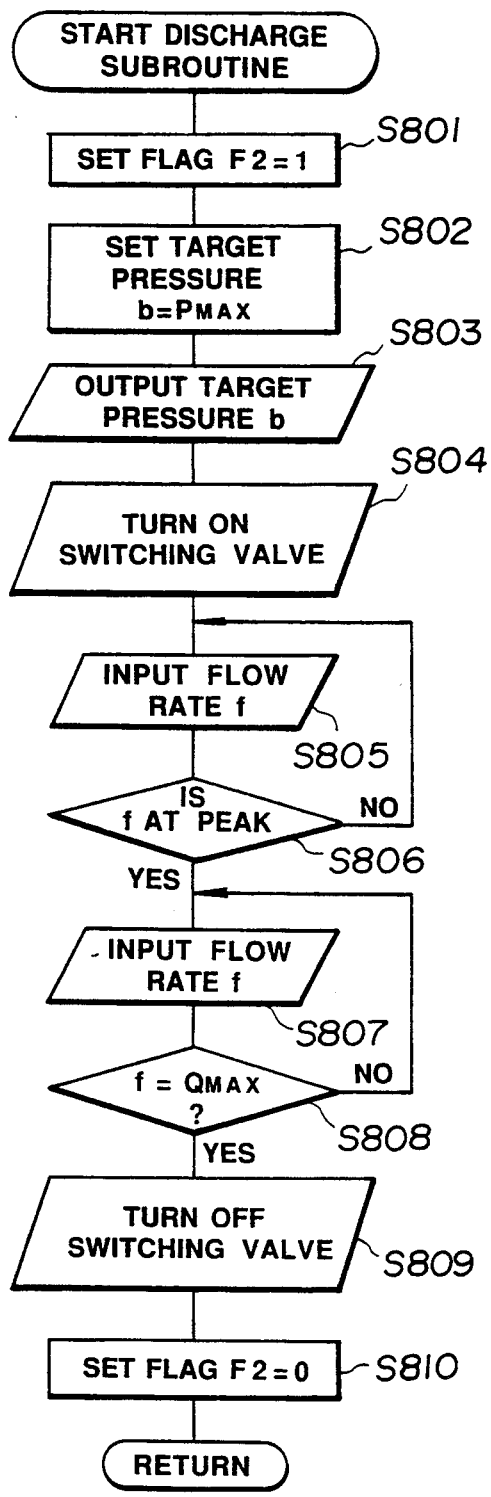

In a step S701, the target pressure d for the pump 4 is calculated. In a step S702, the controller 14 calculates a pump discharge pressure c in accordance with a detecting signal Vc of the pressure sensor 52. In a step S703, it is judged whether the pump discharge pressure c is smaller than the target pressure d or not. When the judgment in the step S703 is "YES", the program proceeds to a step S704 wherein the discharge subroutine is proceeded by jumping to the sub-routine program as shown in FIG. 15. When the judgment in the step S703 is "NO", the program proceeds to a step S705 wherein the load flow rate f is read in. In a step S706, wherein it is judged whether the load flow rate f is smaller than the reference value h or not. When the judgment in the step S706 is "NO" ($f \geq h$), the program returns to the step S701. When the judgment in the step S706 is "YES" ($f<h$), the program proceeds to a step S707.

Figure 16:
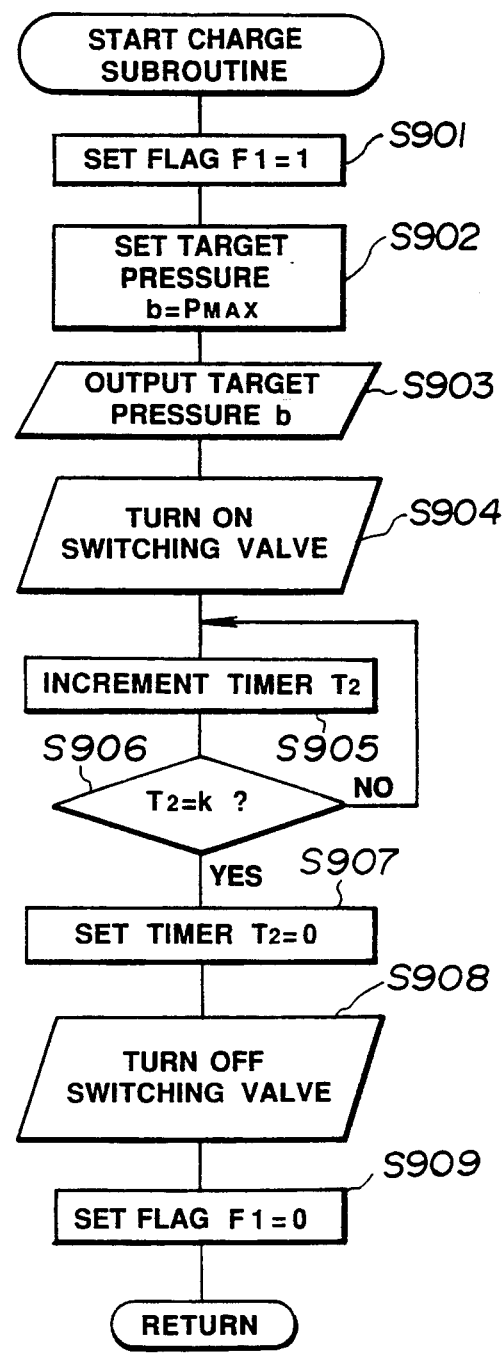

In the step S707, the timer T1 is incremented and the program proceeds to a step S708 wherein it is judged whether the timer T1 is equal to j or not. When the timer is not equal to j, the program returns to the step S707. That is to say, the processing in the steps S707 and S708 is a waiting routine in which a time period is counted until the timer T becomes equal to j. Then, when the timer t1 becomes equal to j, the program proceeds to a step S709 wherein the timer T1 is cleared (T1=0). Then, in a step S710, the load flow rate f is calculated and the program proceeds to a step S711 wherein it is judged whether the load flow rate f is smaller than the reference value h or not. When the judgment in the step S711 is "YES" ($f<h$), the program proceeds to a step S712 wherein a charge sub-routine is operated by jumping to the subroutine program whose flow chart is shown in FIG. 16. Then, the program returns to the step S701. When the judgment in the step S712 is "NO" ($f \geq h$), the program returns to the step S701.

The manner of operation of the discharge sub-routine will be discussed hereinafter with reference to a flow chart is shown in FIG. 15.

In a step S801, the flag F2 is set to be "1" (F2=1), and the program proceeds to the step S802 wherein the target pressure b is set to be equal to the maximum discharge pressure Pmax (b=Pmax). In a step S803, the controller 14 commands to the pump to take the target pressure b. In a step S804, the controller 14 outputs the control signal ig indicative of an ON state to the switching valve 50 to be opened. In steps S805 and S806, it is judged in accordance with the inclination (differentials) whether the load flow rate f has taken a peak value or not. In steps S807 and S808, the program repeats the steps S807 and S808 until the load flow rate takes a maximum discharge flow rate Qmax. In a step S809, the controller 14 outputs the switching signal ig indicative of an OFF state to the switching valve 50 to be closed.

Figure 14:
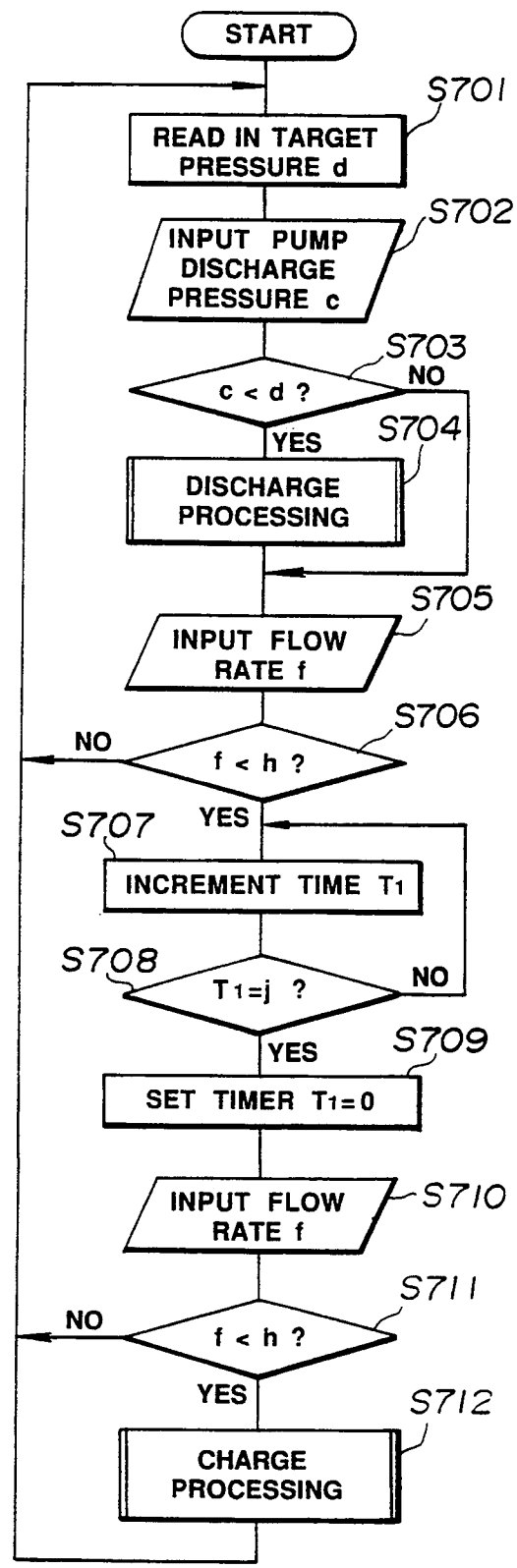

In a step S810, the flag F2 is set to be "0" (F2=0) and the program returns to the processing in FIG. 14.

An operation of a charge sub-routine will be discussed hereinafter with reference to a flow chart shown in FIG. 16.

In a step S901, the flag F1 is set to be "1" (F1=1). After processing steps S902 to S904 which is similar to the steps S802 to S804, the program proceeds to a step S905.

In the step S905, the timer T2 is incremented and the program proceeds to a step S906 wherein it is judged whether the timer T2 is equal to k or not. When the timer is not equal to k, the program returns to the step S907. That is to say, the processing in the steps S905 and S906 is a waiting routine in which a time period is counted until the timer T2 becomes equal to k. Then, when the timer T2 becomes equal to k, the program proceeds to a step S907 wherein the timer T2 is cleared (T2=0).

In a step S906, the controller 14 commands to close the switching valve 50. In a step S907, the flag F1 is set to be "1" (F1=1), and the program returns to the processing shown in FIG. 14.

While the other structure of the fourth embodiment has not been shown and described herewith, it is similar to that of the first embodiment.

Figure 17:
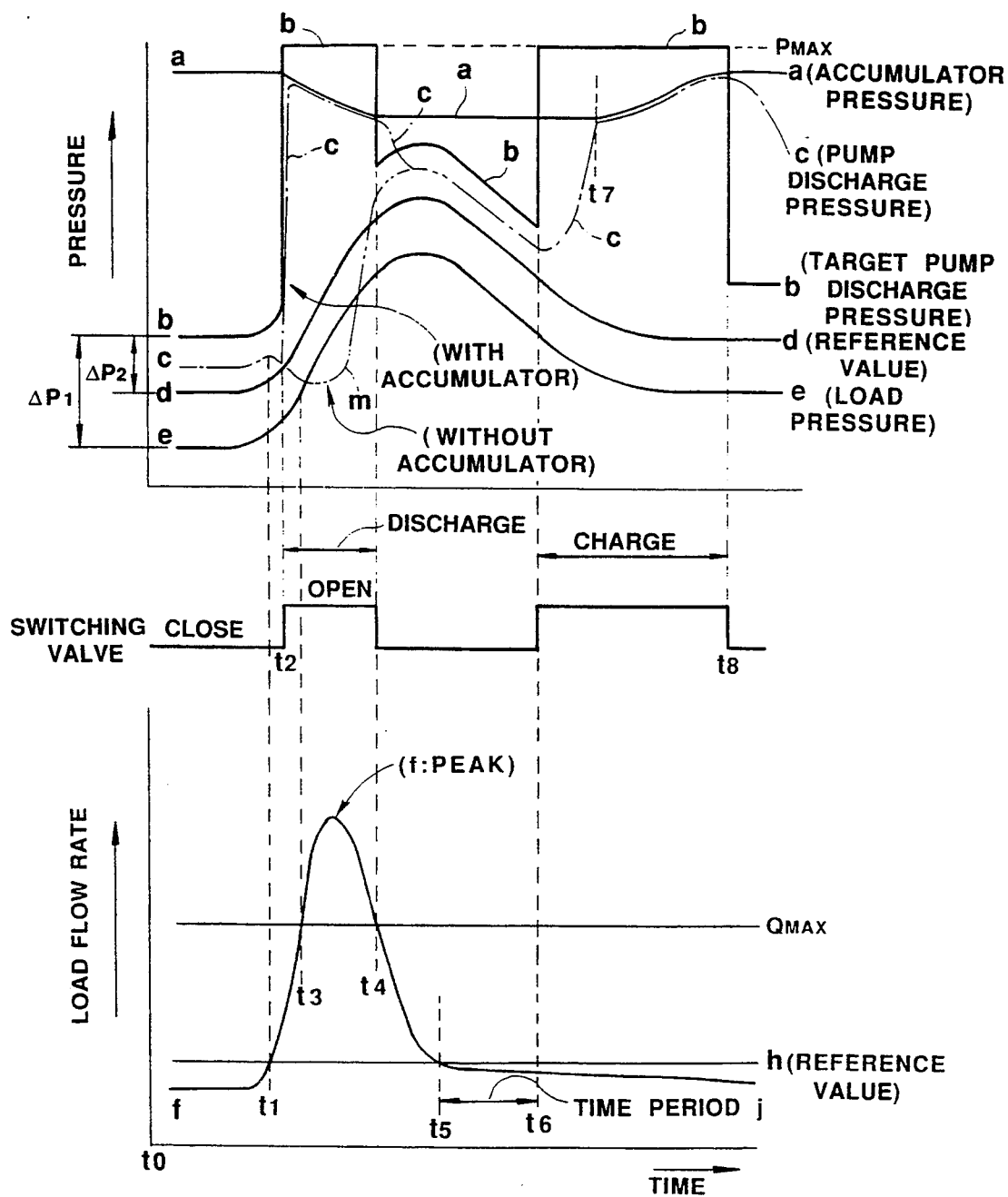
FIG. 17 is a time chart showing a typical example of operation by the fourth embodiment.
Figure 18:
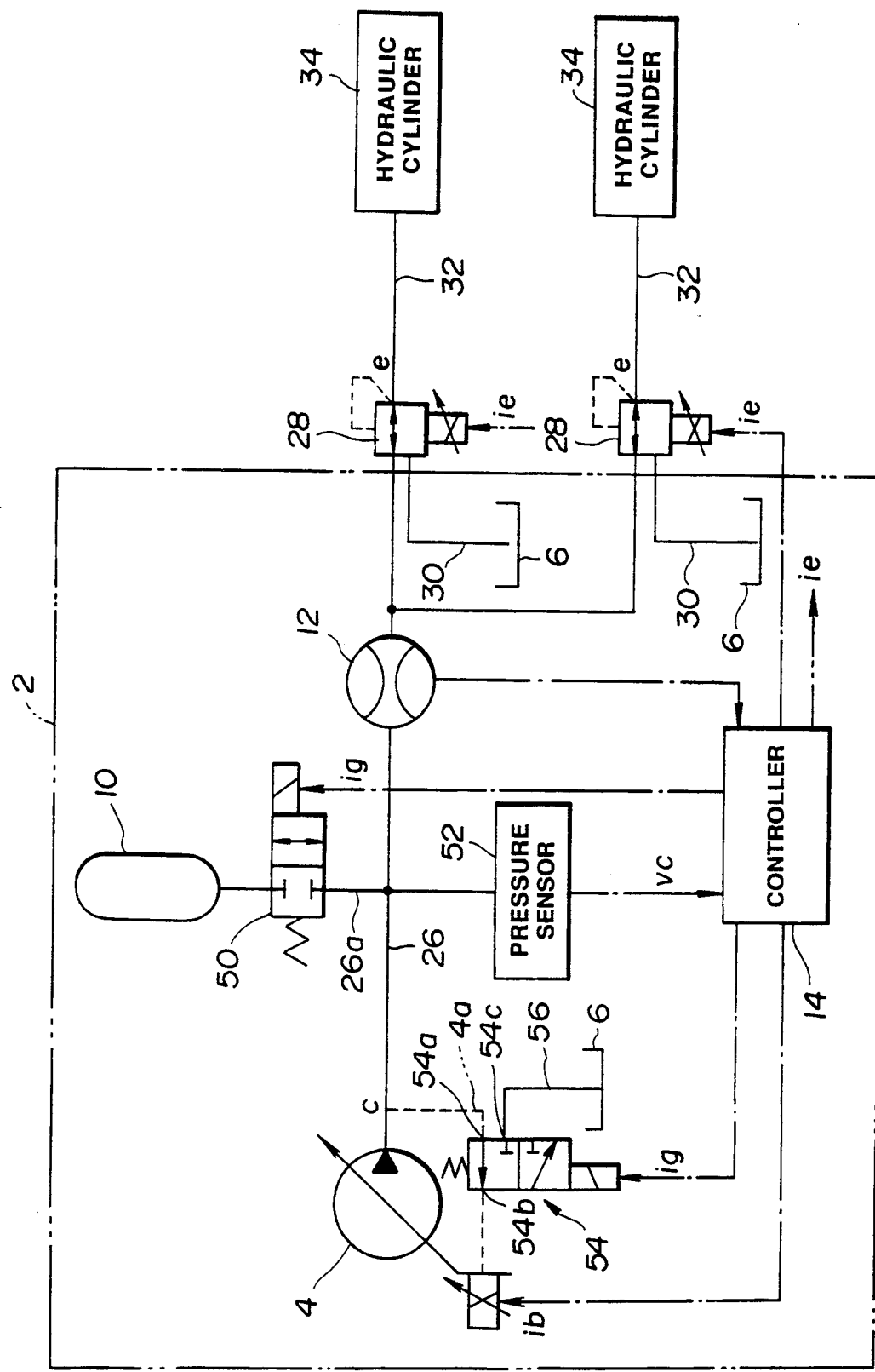
FIG. 18 is a block diagram of a fifth embodiment according to the present invention.

With the thus arranged hydraulic pressure supply apparatus 2, the various pressure in this system is illustrated as shown in FIG. 17.

In a low load operation, the target pressures are maintained to have a relationship that b>c>d>e relative as is similar to that in the first embodiment.

When the load side requires a large flow rate, the real pump discharge pressure is lowered owing that the responsibility of the pump 4 is low as compared with that of the pressure control valve 28. At the time point t2 that the pump real discharge pressure c becomes lower than the target reduced pressure d, the switching valve 50 is opened to communicate the accumulator 10 and the supply conduit 26. With this operation, the accumulator 10 supplies a high pressure fluid to the supply conduit 26, and the discharge pressure c is radically raised to the accumulator pressure a. At this time, the discharge flow rate from the pump 4 is prevented from being decreased since the target pump pressure b is set to be the maximum discharge pressure Pmax.

In this state, if the target discharge pressure of the pump 4 is set to be slightly greater than the accumulator pressure a (which is measured by the pressure sensor installed to the subconduit 26a between the switching valve 50 and the accumulator 10.), the energy efficiency is further improved.

At the time point t4 when the load flow rate f is lowered after have taken a peak value Qmax, the switching valve 50 is closed and the accumulator 10 stops discharging.

After discharging, the switching valve 50 may be automatically closed at the time point that a predetermined time period past the time point t2 and it is not necessary to take account of the flow rate.

With this arrangement, the supply pressure c is prevented from being lowered as illustrated by an imaginary line m which shows a phenomena occurred in a case that the system has not an accumulator.

For a time period from the time point t6 to the time point t8, since the switching valve 50 is opened and the target discharge pressure b is set to be Pmax (b=Pmax), the accumulator 10 is charged. Therefore, the hydraulic pressure supply apparatus 2 of the fourth embodiment performs similar to that of the first embodiment.

Referring to FIGS. 13, 14, and 18 to 20, there is shown a fifth embodiment of the hydraulic pressure supply apparatus 2 which comprises an electromagnetic switching valve 54 of the three port and two position type which is disposed in a pressure feedback passage 4a of the pump 4. The oil passage 4a is communicated with first and second ports 54a and 54b of the switching valve 54. A third port of the switching valve 54 is communicated through a conduit 56 with the reservoir tank 6. The controller 14 outputs a switching signal ig to the switching valve 54. When the switching signal ig is in a off state, the switching valve 54 communicates the first and second ports 54a and 54b. When the switching signal ig is in an ON state, only the second and third ports 54b and 54c are communicated with each other through the switching valve 54. A pair of load unit such as pressure control valves 28 and hydraulic cylinders 34 are communicated with the hydraulic pressure supply apparatus 2.

Figure 19:
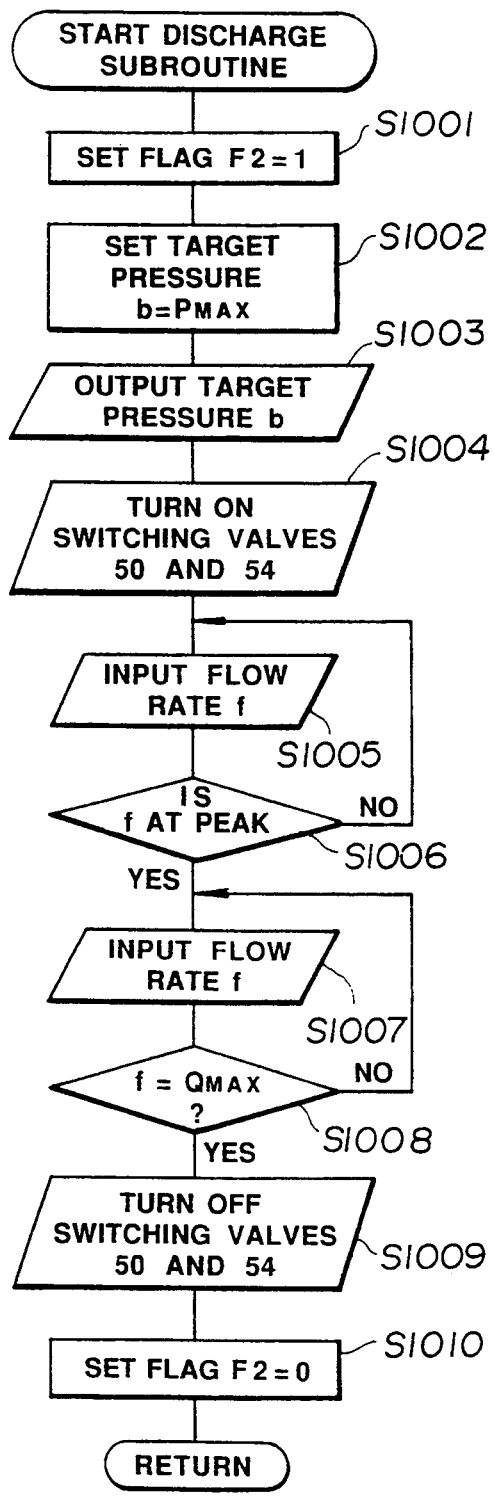
FIGS. 19 and 20 are flow charts which show routines carried out by a controller of the fifth embodiment.
Figure 20:
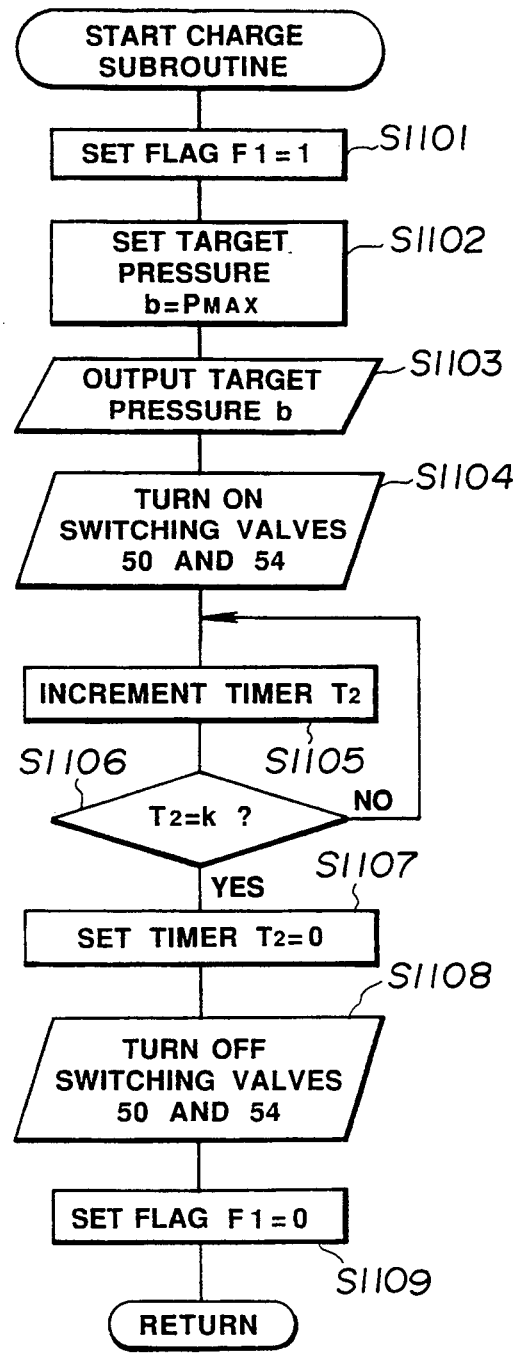

The controller 14 processes the processing in FIGS. 19 and 20, in addition to the processing in FIGS. 13 and 14. A flow chart shown in FIG. 19 is a sub-routine which is carried out during a discharge of the accumulator 10 in the processing in FIG. 14. The sub-routine program in FIG. 19 is similar to the sub-routine program in FIG. 15 except for the steps S1004 in which the switching valves 50 and 54 are turned on and S1009 in which the switching valves 50 and 54 are turned off. Furthermore, a flow chart shown in FIG. 20 is a sub-routine which is carried out during a charge of the accumulator 10 in the processing in FIG. 15. The sub-routine program in FIG. 20 is similar to the sub-routine program in FIG. 16 except for the steps S1104 in which the switching valves 50 and 54 are turned on and S1109 in which the switching valves 50 and 54 are turned off.

While the other structure of the fifth embodiment has not been shown and described herewith, it is similar to that of the fourth embodiment. Accordingly, with this arrangement, when the accumulator 10 is in a charging or discharging condition, a feedback pressure of the pump 4 is lowered to the tank pressure so that the pump 4 can discharge the maximum flow rate. With this operation, the reduction of the discharge flow rate of the pump 4 is prevented from occurring by the pressure feedback function.

In the fourth or fifth embodiment, since a relatively small force is applied to the control solenoid of the pump 4 in a charge or discharge operating condition of the accumulator 10, the control solenoid may be formed small in power.

While the completion of the charge operation in the above-discussed embodiments has been controlled by the timer, it will be understood that the completion of the charge operation may be controlled by comparing the accumulator pressure with a predetermined reference value upon detecting the accumulator pressure by a pressure sensor.

Although the structure of the flow rate sensor 12 has not been shown and described in these embodiment, it will be noted that a turbine type flow rate sensor or a differential pressure flow-meter may be used in the flow rate sensor 12. Furthermore, without using a flow rate sensor, the flow rate may be estimated by the controller 14 upon analyzing a pressure- flow rate relationship or calculating the differential value of the load.

Additionally, it will be understood that the principle of the hydraulic pressure supply apparatus 2 according to the present invention is not limited to the hydraulic system of the vehicle, this principle may be preferably applied to the hydraulic system which changes a requiring hydraulic energy, for example, the hydraulic system for airplanes, fork lift trucks and the like.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A hydraulic pressure supply apparatus for supplying hydraulic fluid under pressure to a load side, said hydraulic pressure supply apparatus comprising:
   a variable displacement pump which is smoothly changeable of discharge pressure to a target discharge pressure;
   a conduit communicating said variable displacement pump and the load side;
   a load pressure control valve disposed between the load side and said conduit, said load pressure control valve controlling a pressure of the hydraulic fluid from said conduit at a regulated pressure;
   an accumulator communicated with said conduit;
   a valve disposed between said accumulator and said conduit, said valve starting to reduce pressure of the fluid of said accumulator when the pressure in said conduit is lower than a target reduced pressure; and
   means for setting the target reduced pressure and the target pump discharge pressure of said pump so that the target pump discharge pressure is greater than the target reduced pressure and the target reduced pressure is greater than a regulated pressure at the load side;
   flow rate detecting means detecting a flow rate supplied to the load side and outputting a signal indicative of the flow rate supplied to the load side;
   flow rate judging means outputting a signal when the flow rate according to the signal from said flow rate detecting means is lower than a set value; and
   charge commanding means setting the target discharge pressure of said pump to be the same as the maximum discharge pressure of said pump and setting the target reduced pressure to be greater than the maximum discharge pressure of said pump, in response to the signal outputted from said flow rate judging means.

2. A hydraulic pressure supply apparatus for supplying hydraulic fluid under pressure to a load side, said hydraulic pressure supply apparatus comprising:
   a variable displacement pump which is smoothly changeable of discharge flow rate thereof and operates to approach its real discharge pressure to a target discharge pressure;
   a conduit communicating said variable displacement pump and the load side;
   a load pressure control valve disposed between the load side and said conduit, said load pressure control valve controlling a pressure of the hydraulic fluid from said conduit at a regulated pressure;
   an accumulator communicated with said conduit;
   a valve disposed between said accumulator and said conduit, said valve being operable to regulate flow between said accumulator and said conduit and having an opening state in which said accumulator is communicated with said conduit and a closing state in which said accumulator is not communicated with said conduit;
   pressure detecting means detecting the real discharge pressure of said pump and outputting a signal indicative of the real discharge pressure of said pump;
   pressure judging means outputting a first signal when the pump real discharge pressure according to the signal from said pressure detecting means is smaller than the target discharge pressure by at least a predetermined value;
   discharge commanding means commanding said valve to take the opening state and setting the target discharge pressure of said pump to maximum pump discharge pressure in response to the first signal from said pressure judging means.

3. A hydraulic pressure supply apparatus for supplying hydraulic fluid under pressure to a load side, said hydraulic pressure supply apparatus comprising:
   a variable displacement pump which is smoothly changeable of discharge flow rate thereof and operates to approach its real discharge pressure to a target discharge pressure;
   a conduit communicating said variable displacement pump and the load side;
   a load pressure control valve disposed between the load side and said conduit, said load pressure control valve controlling a pressure of the hydraulic fluid from said conduit at a regulated pressure;
   an accumulator communicated with said conduit;
   a valve disposed between said accumulator and said conduit, said valve being operable to regulate flow between said accumulator and said conduit and having an opening state in which said accumulator is communicated with said conduit and a closing state in which said accumulator is not communicated with said conduit;
   pressure detecting means detecting the real discharge pressure of said pump and outputting a signal indicative of the real discharge pressure of said pump;
   pressure judging means outputting a first signal when the pump real discharge pressure according to the signal from said pressure detecting means is smaller than the target discharge pressure by at least a predetermined value;
   discharge commanding means commanding said valve to take the opening state and setting the target discharge pressure of said pump to maximum pump discharge pressure in response to the first signal from said pressure judging means;
   flow rate detecting means detecting a flow rate supplied to the load side and outputting a second signal indicative of the flow rate;
   flow rate judging means receiving the second signal from said flow rate detecting means, said flow rate judging means outputting a third signal when the flow rate is lower than a predetermined set value; and charge commanding means setting the target discharge pressure of said pump so as to be the same as the maximum pressure of said pump in response to the third signal from said flow rate judging means.

4. A hydraulic pressure supply apparatus for supplying hydraulic fluid under pressure to a load side, said hydraulic pressure supply apparatus comprising:

a variable displacement pump which is smoothly changeable of discharge flow rate thereof in accordance with a feed-back signal indicative of a real pump discharge pressure and a target pump discharge pressure;

a conduit communicating said variable displacement pump and the load side;

an accumulator communicated with said conduit;

a first valve disposed between said accumulator and said conduit to regulate flow therebetween, said first valve being operable to be in an opening state in which said accumulator is communicated with said conduit and a closing state in which said accumulator is not communicated with said conduit;

means for detecting the real discharge pressure from said pump and outputting a first signal indicative of the pump discharge pressure;

pressure judging means receiving the first signal from said pump discharge pressure detecting means, said pressure judging means outputting a second signal when the pump discharge pressure is smaller than the target discharge pressure by at least a predetermined value;

discharge commanding means commanding said first valve to take the opening state and setting the target discharge pressure of said pump to the maximum pressure, in response to the second signal from said pressure judging means;

a second valve having first, second and third ports, the first and second ports being communicated with a pressure feedback port of said pump, the second port being disposed downstream of the first port relative to said pump, and the third port being communicated with a reservoir tank for storing hydraulic fluid therein; and feedback passage switching means taking one of a first condition in which the first port to be communicated with the second port and a second condition in which the second port is communicated with the third port, said feedback passage switching means taking the first condition when said first valve takes the closing state and taking the second condition when said first valve takes the opening state.

* * * * *